(12) United States Patent
Kalm et al.

(10) Patent No.: US 11,820,604 B1
(45) Date of Patent: Nov. 21, 2023

(54) PACKAGING SIZER

(71) Applicant: Amazon Technologies, Inc., Seattle, WA (US)

(72) Inventors: William Scott Kalm, Seattle, WA (US); Kushal Patel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 730 days.

(21) Appl. No.: 16/835,205

(22) Filed: Mar. 30, 2020

(51) Int. Cl.
| | |
|---|---|
| *B65G 39/18* | (2006.01) |
| *B65G 9/00* | (2006.01) |
| *B26D 7/32* | (2006.01) |
| *B26D 7/01* | (2006.01) |
| *B65H 35/00* | (2006.01) |
| *B65B 31/06* | (2006.01) |
| *B65H 29/58* | (2006.01) |

(52) U.S. Cl.
CPC ............. *B65G 39/18* (2013.01); *B26D 7/018* (2013.01); *B26D 7/32* (2013.01); *B65B 31/06* (2013.01); *B65G 9/002* (2013.01); *B65H 29/58* (2013.01); *B65H 35/0086* (2013.01); *B65G 2203/0233* (2013.01); *B65G 2203/042* (2013.01)

(58) Field of Classification Search
CPC ....... B65B 61/04; B65B 61/06; B65B 61/065; B65B 61/08; B65B 61/10; B65H 35/00; B65H 35/0006; B65H 35/0073; B65H 35/008; B65H 35/0086; B65H 35/0093; B65H 35/04; B65H 35/06; B65H 35/08; B65H 29/58; B65H 29/60; B65H 2301/4482
See application file for complete search history.

(56) References Cited

U.S. PATENT DOCUMENTS

| | | | | |
|---|---|---|---|---|
| 5,235,883 | A | * | 8/1993 | Jeske ........................ B07C 5/38 83/106 |
| 5,425,834 | A | * | 6/1995 | Shinohara ............... B29C 70/54 156/360 |
| 6,050,166 | A | * | 4/2000 | Gauler ................... B26D 5/007 83/365 |
| 8,066,284 | B2 | * | 11/2011 | Choi ...................... B65H 29/58 271/301 |
| 9,914,278 | B2 | * | 3/2018 | Pettersson ............. B31B 50/006 |
| 2003/0033915 | A1 | * | 2/2003 | Glemser ................ B65H 35/08 83/26 |

(Continued)

FOREIGN PATENT DOCUMENTS

EP   0 218 197   *   4/1987 ............. B65H 35/06

OTHER PUBLICATIONS

U.S. Appl. No. 16/709,836, U.S. Patent Application, "Bag Loading Machine," filed Dec. 10, 2019.

*Primary Examiner* — Evan H MacFarlane
(74) *Attorney, Agent, or Firm* — Kilpatrick Townsend & Stockton LLP

(57) ABSTRACT

A packaging sizer can receive and segment packaging into two or more segments. The packaging sizer can receive the packaging on a conveyance surface and convey the packaging to a position for segmenting. A segmenting assembly can segment the packaging to form two or more segments. The resulting segments can be directed in different directions for different purposes. For example, one or more of the segments can be removed from the packaging sizer and one or more segments can be moved to a position for manipulation by a packaging manipulator.

11 Claims, 10 Drawing Sheets

(56) References Cited

U.S. PATENT DOCUMENTS

| | | | |
|---|---|---|---|
| 2004/0173068 A1* | 9/2004 | Adachi | B26D 7/2635 |
| | | | 83/13 |
| 2008/0247682 A1* | 10/2008 | Murray | B31B 70/00 |
| | | | 53/457 |
| 2018/0086590 A1* | 3/2018 | Mizutani | B65H 37/04 |
| 2018/0118499 A1* | 5/2018 | Fukushima | B65H 29/60 |
| 2021/0122131 A1* | 4/2021 | Chatry | B31B 50/142 |

* cited by examiner

PACKAGING SIZER

BACKGROUND

Packing for shipping an item may depend on the item type, the shipping route, the delivery location, and other similar factors. Packaging can be manufactured ahead of time or built on demand. Packaging can vary from simple envelopes for one or more items to more complex customized pallets for shipping larger or oddly shaped items. For example, paper bags may be cut to a custom size to accommodate items for delivery.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to sizing devices and techniques for using the sizing devices for sizing packaging (e.g., packaging for items). The packaging sizers can be used to make custom sized packaging based on an item's dimensions. For example, the packaging sizer can receive standard size packaging and segment (e.g., cut) the packaging to create custom sized packaging. Items can be securely packaged in the custom sized packaging and sent to a purchaser. Segmenting the standard packaging to create custom sized packaging can reduce packaging waste. For example, the segment that is removed from the standard packaging can be recycled.

Turning now to a particular example, in this example, a packaging sizer is provided that creates custom sized item packaging. The packaging sizer can receive standard sized packaging, for example, from a packaging feeding device. The standard packaging can be deposited into the packaging sizer in a conveyance path. The conveyance path can convey the packaging to a position for segmenting (e.g., a segmenting position). The packaging can be segmented (e.g., cut) to a custom sized based on, for example, the dimensions of an item. The packaging can be segmented into a packaging segment and a tailing (e.g., waste) segment. The tailing segment can be conveyed out of the conveyance path in a first direction, for example, towards a recycling conveyor and/or recycling container. The packaging segment can be conveyed in a second direction, for example, towards a packaging manipulation device. In some examples, the tailing and/or packaging segment can be directed toward the first or second direction using a diverter. The packaging manipulation device can engage with the packaging segment and prepare the packaging segment for receiving one or more items. Because the packaging has been sized to fit the items, additional padding and/or packaging may not need to be used to secure the items within the packaging. Additionally or alternatively, the portion of the packaging that has been removed by the packaging sizer can be recycled and/or reused prior to sending the item to a purchaser.

Figure 1:
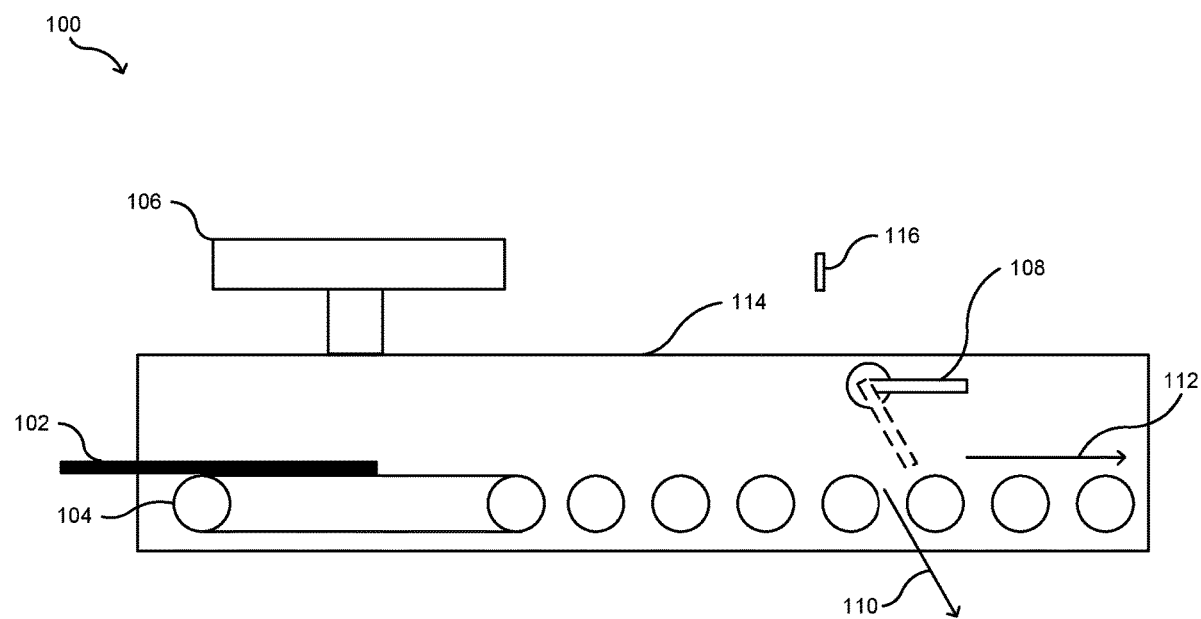
FIG. 1 illustrates a simplified packaging sizer, in accordance with embodiments, for sizing packaging.

Turning now to the figures, FIG. 1 illustrates a simplified packaging sizer 100, in accordance with embodiments, for sizing packaging 102. The packaging sizer 100 includes a conveyance assembly 104 to convey the packaging 102 to a segmenting position. The conveyance assembly 104 can at least partially define a conveyance pathway (e.g., a conveyance channel) along which the packaging 102 is conveyed. The segmenting assembly 106 can segment the packaging 102 into two or more segments, for example, a packaging segment and a tailing segment. The conveyance assembly 104 can convey the segments towards a diverter 108. The diverter 108 can aid in positioning the packaging 102 in the segmenting position and/or direct one or more of the segments in one or more directions. For example, the diverter 108 can pivot to a first position (e.g., shown in phantom lines in FIG. 1) to direct one or more segments towards a first direction 110 and pivot to a second position (e.g., shown in solid lines) to direct one or more segments towards a second direction 112. The segments directed towards the first direction 110 can be deposited onto a conveyor and/or into a bin, for example, for recycling of the segments. The segments directed towards the second direction 112 can be positioned on the packaging sizer 100, for example, for engagement with a packaging manipulation device. In various examples, one or more of the conveyance assembly 104, the segmenting assembly 106, and/or the diverter 108 may be mounted to a frame 114. The frame 114 can support the various components and may at least partially define the conveyance pathway.

One or more sensor 116 can be positioned to detect at least a portion of the packaging 102. For example, the sensors 116 can be positioned to detect a portion of the leading edge of the packaging 102. The sensors 116 is shown positioned above the conveyance assembly 104, however, the sensors can be positioned below, to the side, mounted on the diverter, or in any suitable position for detecting the packaging 102. The sensors 116 can detect the packaging 102 to aid in positioning the packaging, such as to control movement toward, into, or away from the segmenting position. For example, the sensors 116 can detect when a portion of the leading edge of the packaging 102 is adjacent to the diverter 108 and communicate with the conveyance assembly 104, for example via a controller, to instruct the conveyance assembly to stop conveyance of the packaging. Additionally or alternatively, the sensors 116 can detect other features and/or control other elements of the packaging sizer 100. For example, the sensors 116 may detect respective ends or other features of respective segments (such as the tailing segment or packaging segment) and communicate with the diverter 108, for example via a controller, to instruct the diverter to move between orientations when a respective feature of one segment or another is detected at a relevant distance from the diverter. The sensors 116 can be or include optical, mechanical, digital, infrared, or any suitable sensor for detecting the packaging 102.

Figure 2:
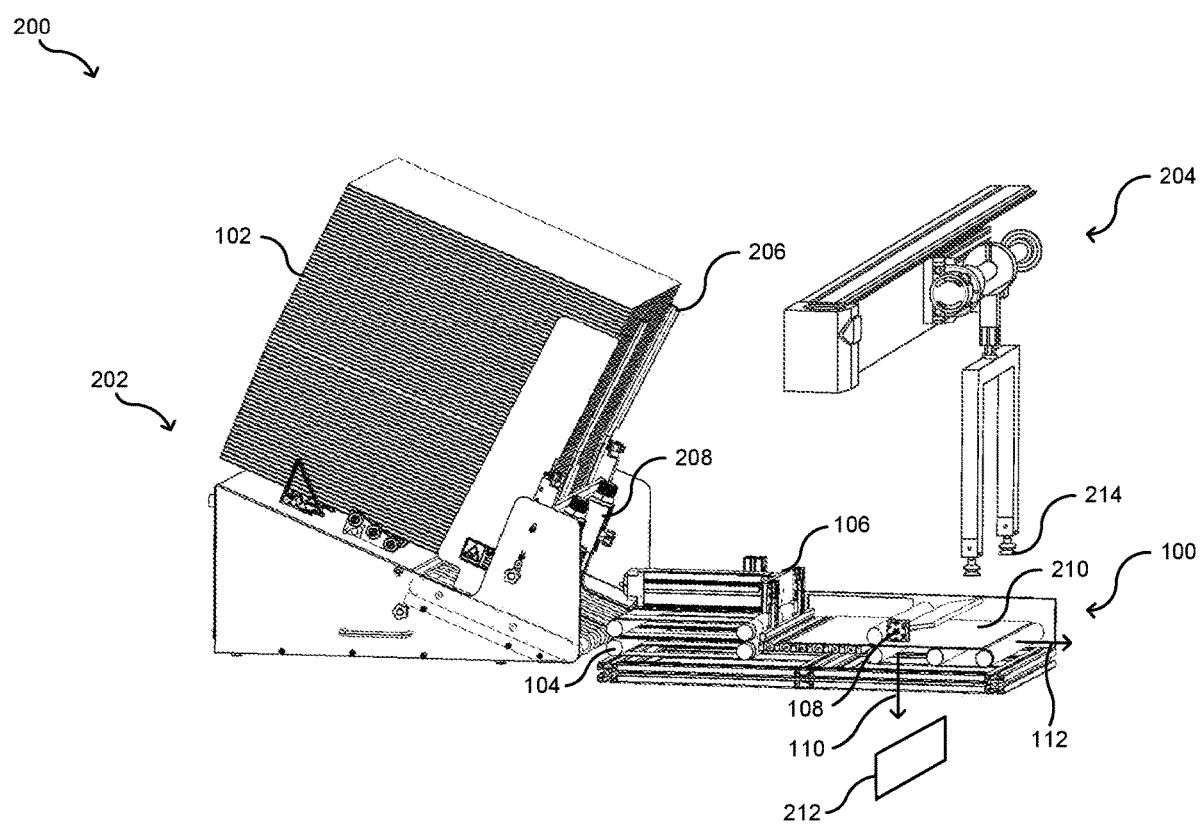
FIG. 2 illustrates a packaging system that can be used with particular embodiments of the packaging sizer of FIG. 1.

FIG. 2 illustrates a packaging system 200 that can be used with particular embodiments of the packaging sizer 100 of FIG. 1. The packaging system 200 includes a packaging feeder 202 and a packaging manipulation device 204, however, additional and/or alternative devices may be used in the packaging system 200. The packaging feeder 202 can convey packaging 102 to the packaging sizer 100, for example, by depositing the packaging into the conveyance pathway. The packaging sizer 100 can segment the packaging 102 and convey the segmented packaging to a position for engaging with the packaging manipulation device 204. The packaging manipulation device 204 can manipulate the packaging 102 and prepare the packaging for insertion of one or more items.

The packaging 102 can be or include one or more of packaging, a package, a container and/or a shipping receptacle used for packaging items. The packaging 102 can have an interior volume surrounded by one or more surfaces having height, width, and length dimensions. For example, the packaging 102 may have a height between 12 inches and 24 inches, an unfolded width between 3 inches and 10 inches, and a length between 6 inches and 18 inches. Thus, the packaging 102 may have interior volumes between 200 cubic inches and 5000 cubic inches. The packaging 102 can have uniform dimensions, e.g., such that the packaging has the same height, width, and length. However, the packaging 102 may have varying dimensions.

The packaging 102 can be or include material that can be segmented and has enough strength to contain one or more items. In many embodiments, the packaging 102 can be a bag with one end open for receiving items. For example, the packaging 102 can be a foldable paper bag with an open top. The packaging 102 can be or include pillowed bags, gusseted bags, pouch bags, padded pouches, paper, cardboard, plastic, or any material suitable for containing items.

The packaging 102 can be configured in a storage orientation. In the storage orientation, the packaging 102 can be in a folded and/or flattened state to reduce the interior volume of the packaging and/or to make the packaging easier to store (e.g., making the packaging easier to stack together). For example, packaging 102 can be in a flattened state stacked with additional packaging to form a stack of flattened packaging that can be more easily transported and loaded into the packaging feeder 202. The packaging 102 may additionally or alternatively be wound around a spool in the storage configuration. In the storage orientation, the width of the packaging 102 may be, for example, between 0.5" and 2" or some other dimension less than the width of the packaging in the unfolded state.

The packaging feeder 202 can hold one or more of the packaging 102 and feed the packaging into the packaging sizer 100. However, the packaging 102 may be fed directly into the packaging sizer 100. The packaging feeder 202 can include one or more positions or berths for receiving the packaging 102. One or more of the positions can include a storage component 206 for receiving and/or storing the packaging 102 on the packaging feeder 202. For example, the packaging feeder 202 can include a hopper, a container, a roll of packaging 102, and/or any suitable component for holding packaging. The storage component 206 can store packaging 102 in or on the packaging feeder 202 and feed multiple packaging to the packaging sizer 100 before needing to be refilled with additional packaging. The packaging 102 can be placed on the packaging feeder 202 in a storage orientation. For example, the packaging 102 can be flattened and multiple packaging can be stacked on the packaging feeder 202. The packaging 102 can additionally or alternatively be positioned on a roll, e.g., such that the packaging is unrolled as it is fed into packaging sizer 100.

The packaging feeder 202 can include a feeding device 208 to feed the packaging into the packaging sizer 100. The packaging feeder 202 can automatically feed the packaging 102 to the packaging sizer 100. For example, packaging 102 can automatically be moved by rollers or other suitable drivers to move from the bottom of the stack of packaging and toward the packaging sizer 100. However, the feeding device 208 may be manually operated to move the packaging 102 from the packaging feeder 202 to the packaging sizer 100.

In various embodiments, the packaging feeder 202 may feed multiple packaging sizers 100. For example, the packaging feeder 202 may be moveable between various positions for feeding the multiple packaging sizers 100. In further embodiments, multiple packaging feeders 202 can feed a single packaging sizer 100. For example, multiple packaging feeders 202 having packaging 102 with different dimensions may feed into a single packaging sizer 100.

The packaging 102 can be fed into the packaging sizer 100. The packaging sizer 100 can receive the packaging 102 on a conveyance assembly 104 and convey the packaging to a segmenting position. The packaging sizer 100 can segment the packaging 102 into a packaging segment 210 and a tailing segment 212. The packaging segment 210 can have a sealed bottom, an open top, and an interior volume for receiving one or more items. The tailing segment 212 can have one or more open sides and can be recycled and/or used to contain one or more items. As an illustrative example, the packaging 102 may be a bag with one end sealed and starting dimensions in a storage orientation of a height of 20 inches, a width of 1 inch, a length of 12 inches, and an interior cubic volume of 240 cubic inches. The packaging 102 can be segmented into a packaging segment 210 having a sealed bottom and an open top with dimensions of a height of 14 inches, a width of 1 inch, a length of 12 inches, and an interior cubic volume of 168 cubic inches and a tailing segment 212 having an open top and an open bottom and dimensions of a height of 6 inches, a width of 1 inch, a length of 12 inches, and an interior cubic volume of 72 cubic inches. The packaging 102 may additionally or alternatively be segmented along the width and/or the length into one or more segments.

The tailing segment 212 can be conveyed out of the packaging sizer 100 in direction 110. For example, the tailing segment 212 can be conveyed out of an opening in the bottom of the packaging sizer 100. The tailing segment 212 can be deposited into a container and/or conveyor for transporting to another position in a warehouse environment. For example, the tailing segment 212 can be transported to a recycling area.

The packaging segment 210 can be conveyed in direction 112 to an engagement position. The packaging manipulation device 204 can engage with the packaging segment 210 when the packaging segment is in the engagement position. For example, the packaging manipulation device 204 can engage with and remove the packaging segment 210 from the packaging sizer 100. In various embodiments, the packaging manipulation device 204 can be or include a gripping device 214 for attaching to the packaging segment 210. Examples of such packaging manipulation devices 204 are disclosed in U.S. application Ser. No. 16/709,836, filed on Dec. 10, 2019 and titled "BAG LOADING MACHINE", the entire disclosures of which is herein incorporated by reference. The gripping device 214 may include suction cups or other grippers that can engage the packaging segment 210 in the engagement position and may further include a rotating actuator capable of pivoting the attached packaging segment to an upright position that may facilitate opening and/or loading of the packaging segment 210 in a top-down orientation.

Figure 3:
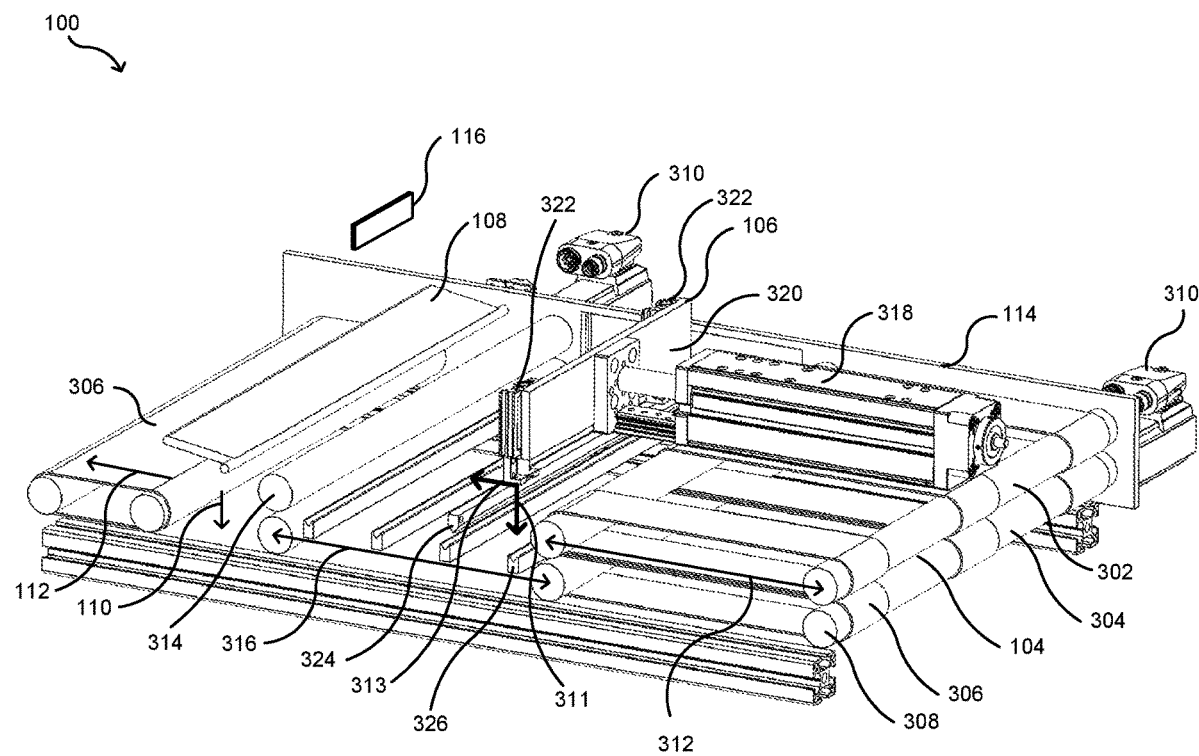
FIG. 3 illustrates an example of a detailed packaging sizer of FIG. 1, according to particular embodiments.

Turning to FIG. 3, a detailed illustration of a portion of an example packaging sizer 100 of FIG. 1 is shown. The packaging sizer 100 includes conveyance assembly 104, segmenting assembly 106, and diverter 108. For clarity, the packaging sizer 100 is depicted in FIG. 3 from a reverse orientation from the view shown in FIG. 2 (e.g., rather than depicting an orientation that facilitates processing from the left to the right of the view as in FIG. 2, the view in FIG. 3 depicts an orientation that facilitates processing from the right to the left of the view in FIG. 3).

The conveyance assembly 104 can convey, move, transport, or otherwise advance the packaging 102 from one position to another. The conveyance assembly 104 can at least partially define a conveyance pathway through which the packaging 102 is conveyed. The conveyance pathway and/or the conveyance assembly 104 can extend some or all of the length of the packaging sizer 100. For example, the conveyance assembly 104 can convey packaging 102 from a first edge of the packaging sizer 100 to a second opposing edge of the packaging sizer. In various embodiments, the conveyance assembly 104 can include one or more openings for removing packaging from the conveyance pathway. For example, the conveyance assembly 104 can include an opening in a bottom surface of the packaging sizer 100 to allow for ejection of one or more segments of the packaging 102 from the conveyance pathway.

The conveyance assembly 104 can include an upper conveyance surface 302 and/or a lower conveyance surface 304. The upper and lower conveyance surfaces 302, 304 can be spaced apart to at least partially define a conveyance channel for receiving packaging 102. In various embodiments, the upper and lower conveyance surfaces 302, 304 can move apart from one another to accommodate packaging 102 of various widths. For example, prior to receiving the packaging 102, the upper and lower conveyance surfaces 302, 304 can be touching or almost touching. When the packaging 102 is received, the upper and lower conveyance surfaces 302, 304 can move apart such that the upper and lower conveyance surfaces are in contact with at least a portion of opposing sides of the packaging. For example, the upper and lower conveyance surfaces 302, 304 may be biased toward one another by springs, a weight of the upper conveyance surface 302, and/or other biasing features that provide a biasing force that may be temporarily overcome in association with feeding the packaging 102 to permit the packaging to be received and/or maintained in contact with the upper and lower conveyance surfaces 302, 304.

The upper and/or the lower conveyance surfaces 302, 304 can include a belt 306 (e.g., a conveyor belt) spanning between rollers 308. The belt 306 can have a width that is a portion of the width of the packaging sizer 100, however, the belt may have a width that is the same or substantially the same width as the packaging sizer. In some embodiments, multiple belts 306 may span between the rollers 308.

One or more of the rollers 308 can be driven by a motor 310 to advance the belt 306. For example, the motor 310 can drive the belt 306 to advance the packaging 102. However, the rollers 308 may be non-driven. The rollers 308 can be separated by a distance 312. The distance 312 can be substantially equal to or slightly less than the height of packaging segment 210, for example.

The conveyance assembly 104 can convey the packaging 102 to a segmenting position for segmenting of the packaging. For example, the packaging 102 can be advanced by the conveyance assembly 104 until a leading edge of the packaging contacts one or more forward rollers 314. In the segmenting position, the packaging 102 can be segmented by the segmenting assembly 106. The segmenting assembly 106 can include actuator 318 connected with cutting device 320. The actuator 318 can move the cutting device 320 (e.g., along the frame 114 and/or in direction 313) to a position for segmenting the packaging 102, such as based on one or more dimensions of one or more items. For example, the actuator 318 can move the cutting device 320 to a position for segmenting the packaging 102 such that the packaging segment 210 has a length that is at least partially based on the dimensions of an item. The actuator 318 can position the cutting device 320 among different positions along the packaging 102 for varying resulting sizes of segments of the packaging. For example, the actuator 318 can position the cutting device 320 at a first position for segmenting first packaging 102 and can position the cutting device at a second position for segmenting second packaging 102. The actuator 318 can be or include a manual actuator, a pneumatic actuator, a hydraulic actuator, an electric actuator, a spring actuator, a motor, or any suitable device for moving the cutting device 320.

The cutting device 320 can include one or more activators 322 connected to a cutter 324. The activators 322 can be or include any structure and/or device to operate or aid in operating the cutter 324 (e.g., to turn on/off the cutter 324 and/or to physically move the cutter). The activators 322 can be mounted to a mounting plate and/or to the actuator 318. In various embodiments, the activators 322 can be mounted such that they can move the cutter 324 in direction 311. The activators 322 can apply force to press the cutter 324 through the packaging 102. The activators 322 can apply a force normal to or substantially normal to one or more surfaces of the packaging 102 (e.g., direction 311). The activators 322 can be the same or similar type of device as actuator 318, however, the activators 322 may be a different type of device as actuator 318. In some embodiments, the activators 322 and/or the actuator 318 can move the cutter 324 in directions 311 and 313.

The cutter 324 can be an edge or device for piercing packaging 102 (e.g., a cutting blade, laser, water jet, air jet, or any suitable device for cutting the packaging). For example, the cutter 324 can be or include a sharpened edge that can pierce multiple sides of the packaging 102. The cutter 324 can be or include a blade, a wire, a chain, a knife, a saw, a scalpel, a microtome, a punch, a rotating disc, or any suitably sharp object capable of piercing and segmenting the packaging 102. In various embodiments, the cutter 324 can engage with a cutting guide 326. The cutting guide 326 can be a surface or device that aids in the segmenting of the packaging 102. For example, the cutting guide 326 can include a groove or v-shaped cutout that can receive the cutter 324. In some embodiments, multiple cutting guides 326 can be spaced apart. For example, cutting guides 326 can be spaced ½ inch apart. However, cutting guides 326 may be spaced more or less distance apart. In various embodiments, the cutting guides 326 can be spaced apart to accommodate the sizing of segments of the packaging 102. For example, the cutting guides 326 can be spaced apart to accommodate the sizing of packaging 102 in half inch increments. The cutting guide 326 can be or include plastic, metal, wood, and/or any material suitable for withstanding the force from the cutter 324.

In the segmenting position, one end of the packaging 102 can be engaged with the conveyance assembly 104 and a portion of the packaging near an opposing end can be engaged with forward rollers 314. In various embodiments, the forward rollers 314 can include an upper roller and a lower roller. One of more of the upper and lower rollers can be a driven roller. The forward rollers 314 can include one or motors 310 for driving the rollers. The motor 310 can be the same motor that drives the rollers 308 or may be a different motor. The forward rollers 314 can additionally or alternatively include one or more belts 306. The belts 306 can be the same or similar as the belts 306 used with rollers 308. However, the belts 306 may be different (e.g., a different material, a different length, or a different width). In some embodiments, a belt 306 may span from a leading edge of the conveyance assembly 104 to forward rollers 314. In such embodiments, the belt 306 can be or include material to resist cutting by the cutter 324 and/or act as the cutting guide 326.

The forward rollers 314 and the conveyance assembly 104 can be separated by distance 316. Distance 316 can be equal to or less than the height of the packaging segment 210 and/or the tailing segment 212. For example, the packaging 102 can be engaged with the forward rollers 314 and the conveyance assembly 104 such that, after segmenting, the packaging segment 210 and/or the tailing segment 212 can be conveyed from the conveyance assembly 104 to the forward rollers 314. For example, the cutting guide 326 can span from the conveyance assembly 104 to the forward rollers 314.

The diverter 108 can be positioned for directing and/or aiding the positioning of the packaging 102. The diverter 108 can pivot around a central axis to various positions. For example, the diverter 108 can be positioned in a first position where the diverter is generally oriented perpendicular to the conveyance path, in a second position where the diverter is oriented to direct the packaging toward direction 110, and/or in a third direction where the diverter is positioned to allow the packaging to travel along the conveyance path (e.g., toward or along direction 112). The diverter 108 can pivot around a 360 degree arc or may pivot 180 degrees, 90 degrees, 45 degrees, or through some other suitable increment or range. In various embodiments, the diverter 108 can be connected with a motor or actuator for pivoting. The diverter 108 can be or include a plate, mesh, netting, and/or material suitable for positioning and/or directing the packaging 102.

In the first position, the diverter 108 may aid in positioning the packaging 102 in the segmenting position. For example, the diverter 108 may be oriented to stop and/or impede the conveyance of the packaging 102. However, the diverter 108 may be oriented in the first position and the conveyance of the packaging 102 can be stopped prior to the packaging contacting the diverter. For example, the sensors 116 may detect a portion of the leading edge of the packaging 102 and instruct the conveyance assembly 104 to stop conveyance of the packaging prior to the packaging contacting the diverter. In the second position, the diverter 108 can pivot to direct the tailing segment 212 in direction 110. In the third position, the diverter 108 can pivot to allow conveyance of the packaging segment 210 by the forward rollers 314. The forward rollers 314 can convey the packaging 102 past the diverter to a position for subsequent processing, such as for engagement with the packaging manipulation device 204.

The sensors 116 can be positioned to detect a portion of the packaging 102 positioned between the forward rollers 314 and the diverter 108. The sensors 116 can detect the leading edge of the packaging 102 after the leading edge has cleared the forward rollers 314 and before the leading edge has contacted the diverter 108. The sensors 116 can additionally or alternatively detect when a trailing edge of the one or more of the segments 210, 212 has cleared the forward rollers 314 and/or the diverter 108. For example, the sensors 116 can detect when the tailing edge of the tailing segment 212 has cleared the forward rollers 314 and instruct the diverter 108 to pivot to a position allowing the packaging segment 210 to be conveyed to a packaging manipulation position.

In some embodiments, the packaging sizer 100 can include one or more sealing devices for sealing of the packaging 102. As an illustrative example, the packaging 102 can be a tube (e.g., packaging with two sealed sides) that is fed into the packaging sizer 100 and the segmenting assembly 106 can segment and seal an edge of the packaging. A sealing device can additionally or alternatively be included at a position for sealing of the packaging segment 210 (e.g., on an opposing side of the diverter 108 from the forward rollers 314).

Figure 4:
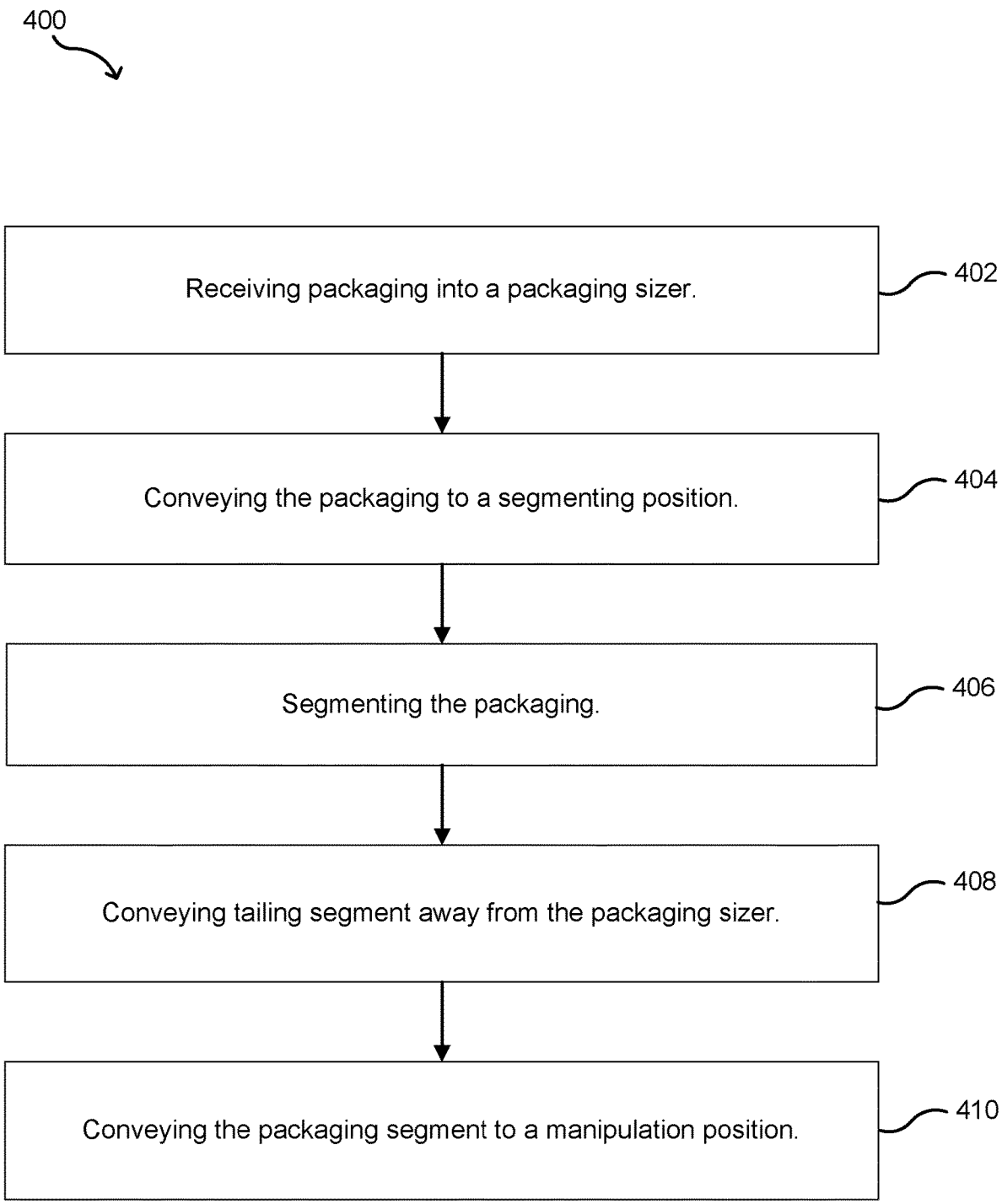
FIG. 4 is a flowchart illustrating a process for sizing packaging that can be used with particular embodiments of the packaging sizer of FIG. 1.

Turning now to FIG. 4, a flowchart illustrating a process 400 for sizing packaging 102 using the packaging sizer 100 of FIG. 1 is shown. Various blocks of the process 400 are described by referencing the components shown in FIGS. 5 through 9, however, additional or alternative components may be used with the process. FIGS. 5 through 9 illustrate the example process 400 using particular embodiments of the example packaging sizer 100 of FIGS. 1 through 3. The process 400 is primarily described with packaging 102 being fed into the packaging sizer 100 with a leading edge that is open (e.g., an open top) and a trailing edge that is sealed (e.g., a closed bottom). However, the packaging 102 can be fed into the packaging sizer 100 in any suitable orientation. For example, the packaging 102 can be fed into the packaging sizer 100 with a sealed leading edge and an open trailing edge. In such an orientation, the packaging 102 can be segmented with the forward segment being the packaging segment 210 and the rearward segment being the tailing segment 212. The packaging segment 210 can be conveyed to a position for manipulation by the packaging manipulation device 204, however, the packaging segment may be engaged by the packaging manipulation device when the packaging is in the segmenting position.

Figure 5:
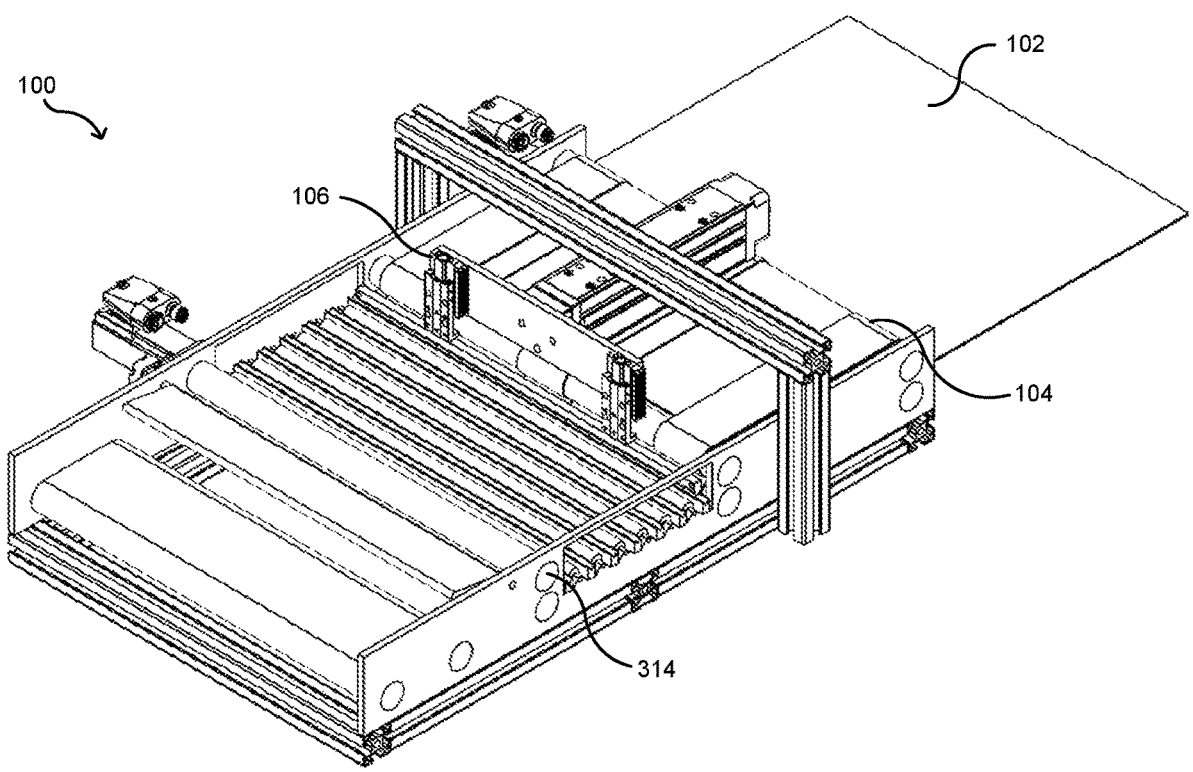
FIGS. 5 through 9 illustrate various states of components that may be implemented in a simplified example of a process for sizing packaging that can be used with particular embodiments of the packaging sizer of FIG. 1.

The process 400 at block 402 can include receiving packaging (e.g., packaging 102) into a packaging sizer (e.g., packaging sizer 100). The packaging 102 can be received from a packaging feeder (e.g., packaging feeder 202). The packaging 102 can be received in a packaging orientation (e.g., in a flattened orientation). The leading edge of the packaging 102 can have an open side (e.g., an open top) and the trailing edge of the packaging can have a sealed side (e.g., a closed bottom). As shown in FIG. 5, the packaging 102 can be received into the packaging sizer 100 via conveyance assembly 104. For example, the packaging 102 can be received between upper and lower conveyance surfaces 302, 304. The packaging 102 can be conveyed via a conveyance pathway from a leading edge of the packaging sizer 100 and at least a portion of the way toward another opposing edge of the packaging sizer.

Figure 6:
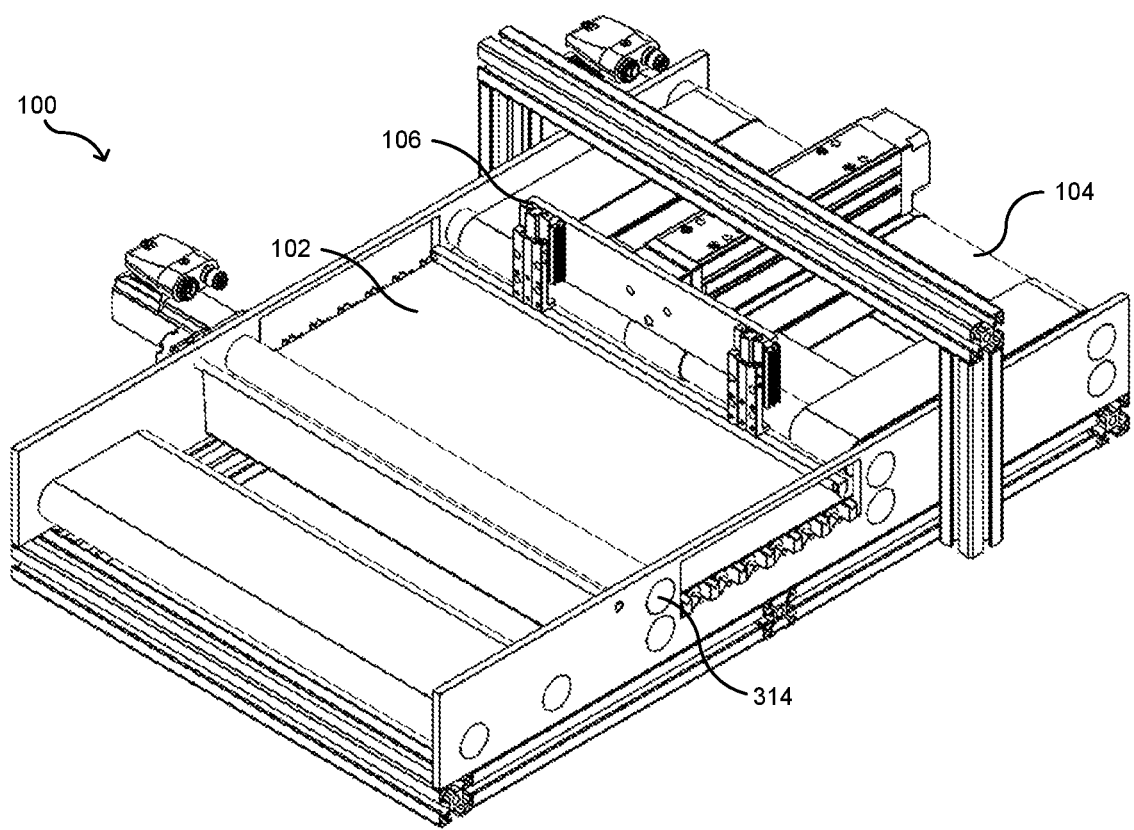

The process 400 at block 404 can include conveying the packaging 102 to a segmenting position. The packaging 102 can be conveyed by the conveyance assembly 104 (e.g., by the conveyance channel formed by upper and lower conveyance surfaces 302, 304). As shown in FIG. 6, the diverter 108 can be positioned to aid in the positioning of the packaging in the segmenting position. For example, the diverter 108 can be positioned to stop and/or hinder the conveyance of the packaging 102. In various embodiments, the packaging 102 can be conveyed by the conveyance assembly 104 until the leading edge of the packaging contacts the diverter 108. The packaging 102 can be held in the segmenting position by the conveyance assembly 104 and/or the forward rollers 314. For example, the conveyance assembly 104 can apply a force to the packaging 102 to reduce and/or prevent movement of the packaging.

Figure 7:
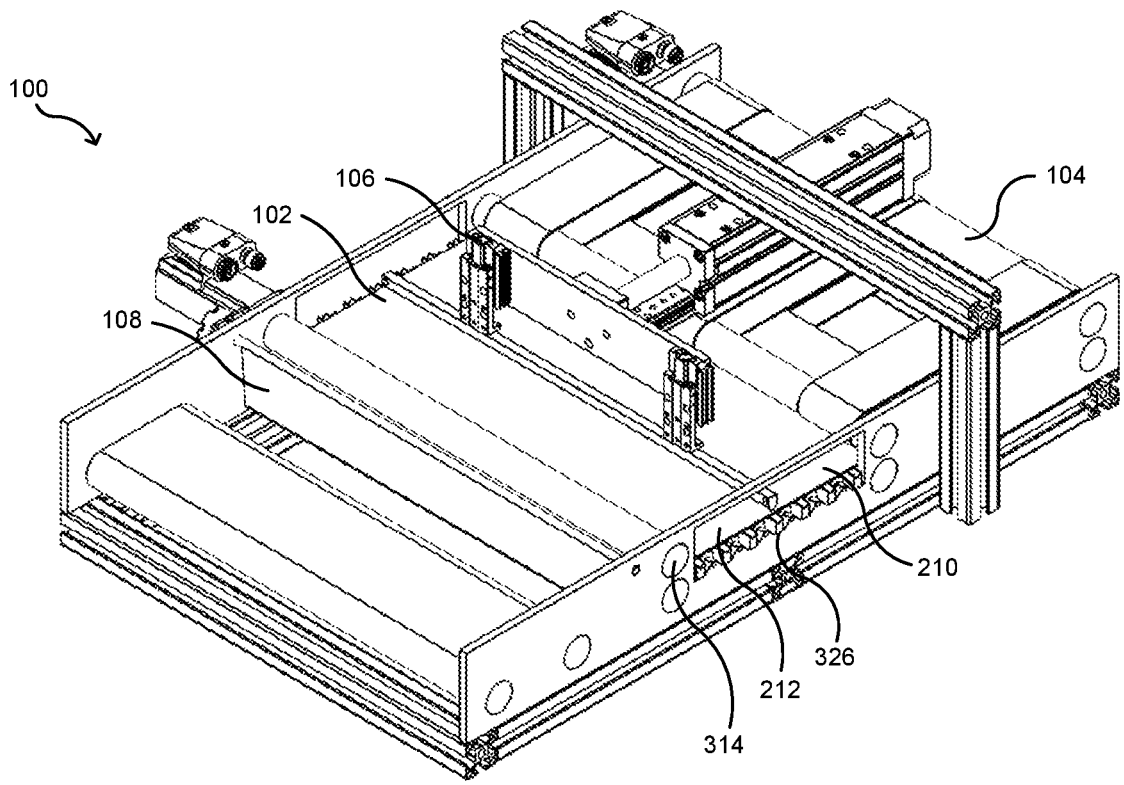

The process 400 at block 406 can include segmenting the packaging 102. The packaging 102 can be segmented by segmenting assembly 106. The segmenting at block 406 may include positioning the segmenting assembly 106 and also operating the segmenting assembly to produce a cut for segmenting the packaging 102. As shown in FIG. 7, the segmenting assembly 106 can be positioned for segmenting of the packaging 102. For example, the segmenting assembly 106 can be positioned along the packaging 102 based on a resulting size of packaging to be produced, such as based on a dimension of an item to be included in the packaging. The segmenting assembly 106 can segment the packaging 102 with cutter 324, for example, a cutting edge. If, for example, the cutter 324 includes a cutting edge a force can be applied to the cutter 324 (e.g., via activators 322) to move the cutter toward the packaging 102 (e.g., downwards toward the packaging). The cutter 324 can be moved toward the packaging 102 until the cutter contacts the cutting guide 326. The cutter 324 can pierce the packaging 102 and separate the packaging into two or more segments. For example, the cutter 324 can separate the packaging 102 into a packaging segment 210 and a tailing segment 212. The packaging segment 210 and/or the tailing segment 212 can be a size that corresponds to one or more dimensions of an item. For example, the packaging segment 210 can have a height to receive an item with a smaller height.

The segmenting assembly 106 can remain in a segmenting position after segmenting the packaging 102. For example, the cutter 324 can remain at or near the cutting guide 326 after segmenting of the packaging 102. However, the cutter 324 may be returned to a starting position (e.g., home position) after segmenting of the packaging 102.

Figure 8:
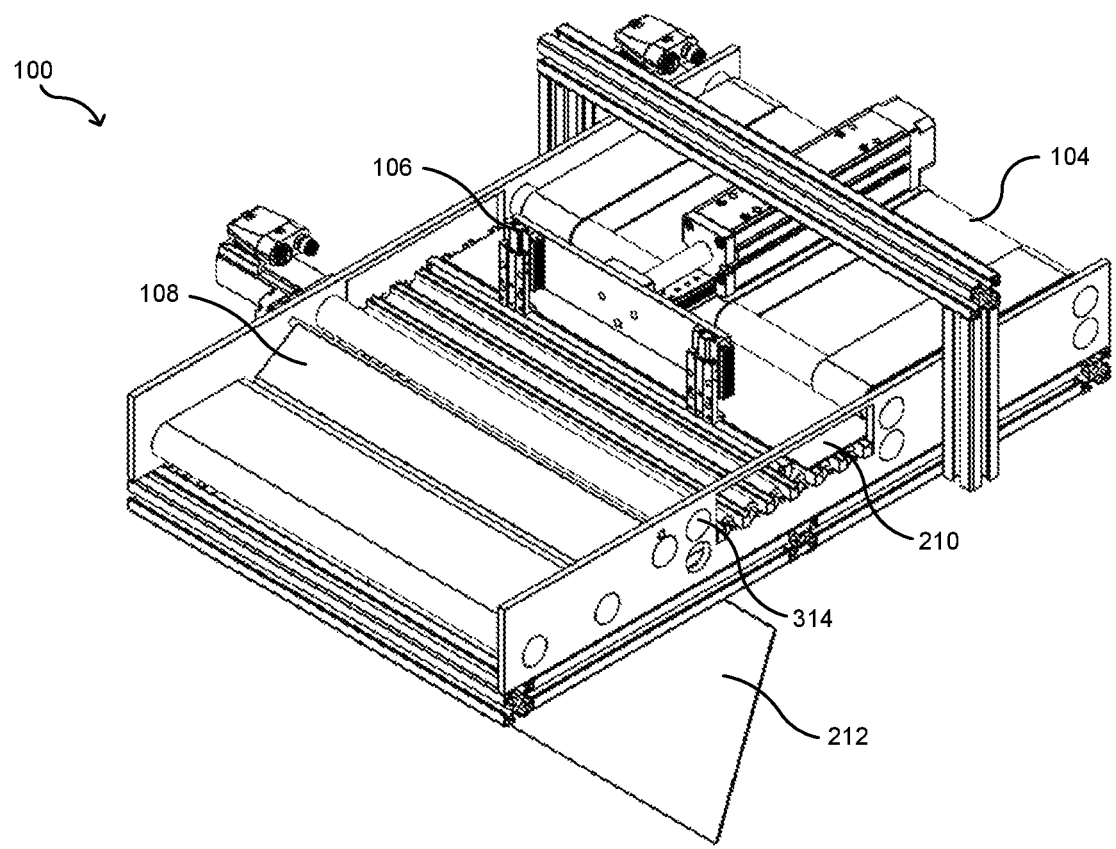

The process 400 at block 408 can include conveying the tailing segment 212 away from the packaging sizer 100. As shown in FIG. 8, the diverter 108 can be pivoted to a position for directing a segment of the packaging 102 (e.g., diverter can direct the tailing segment 212 out of the conveyance channel). In various embodiments, the diverter 108 can be positioned to direct the tailing segment 212 downward out of an opening in the bottom of the conveyance channel. The tailing segment 212 can be conveyed via the conveyance assembly 104 and/or the forward rollers 314. For example, the tailing segment 212 can be conveyed by the forward rollers out of the conveyance pathway.

Figure 9:
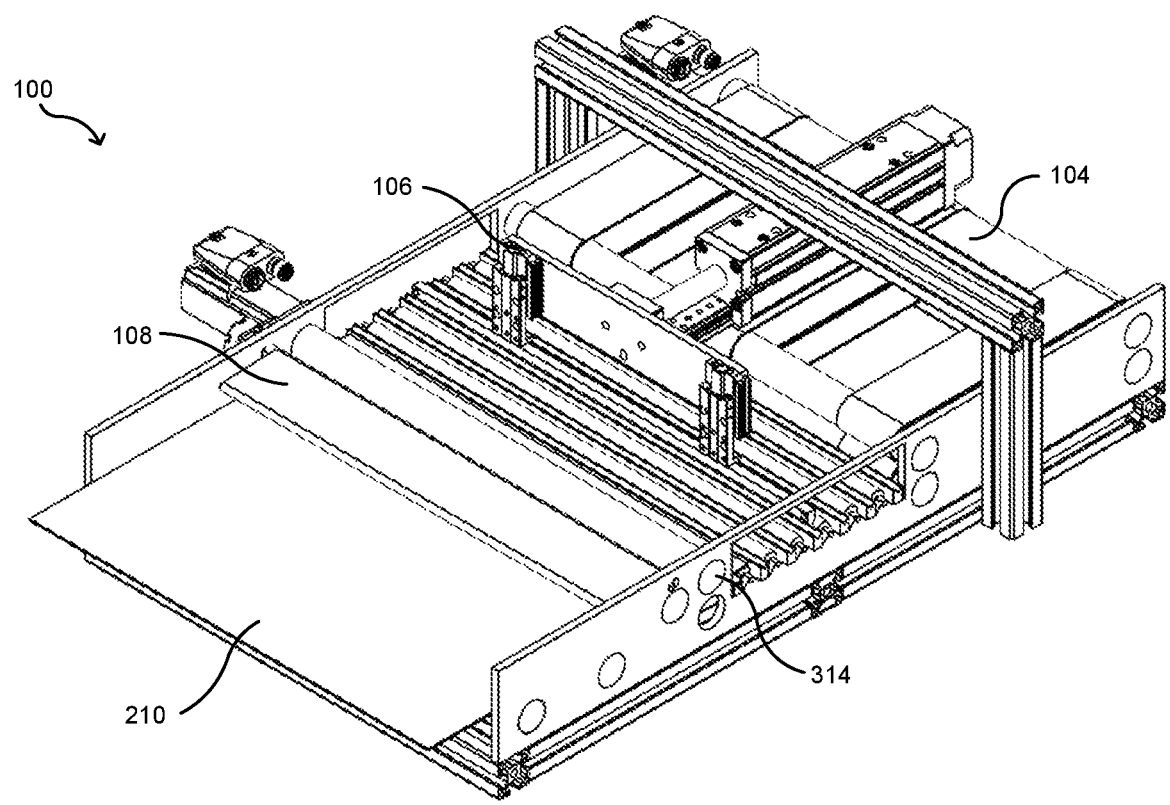

The process 400 at block 410 can include conveying the packaging segment 210 to a manipulation position. As shown in FIG. 9, the diverter 108 can be pivoted to a position for directing the packaging segment 210. For example, the diverter 108 can be positioned to allow for the packaging segment 210 to be conveyed by the conveyance assembly 104 and/or the forward rollers 314. The conveyance assembly 104 can conveyance the packaging segment 210 until a leading edge of the packaging segment contacts the forward rollers 314. The forward rollers 314 can receive the packaging segment 210 and convey the packaging segment to the manipulation position (e.g., past the diverter 108, which may be positioned out of a path of the packaging segment). In various embodiments, the packaging segment 210 and the tailing segment 212 can be conveyed in different directions (e.g., to a manipulation position and out of the conveyance channel, respectively). However, the packaging segment 210 and the tailing segment 212 can be conveyed in the same direction. In the manipulation position, a packaging manipulation device 204 can engage with and manipulate the packaging 102.

In various embodiments, the diverter 108 can be pivoted to one or more positions based on the position of the segments of the packaging 102 in the packaging sizer 100. For example, after segmenting of the packaging 102, the conveyance assembly 104 and/or the forward rollers 314 can be continuously operated to convey the segments. The diverter 108 can pivot to direct the tailing segment 212 out of the packaging sizer 100. The sensors 116 can detect when the trailing edge of the tailing segment 212 has cleared the forward rollers 314 and/or the diverter 108 and communicate with the diverter, for example via controller 1002, to pivot. Additionally or alternatively, the height of the tailing segment 212 can be known (e.g. from the positioning of the cutter 324 and/or from dimensions stored in a database) and used to instruct the diverter 108 to pivot when the tailing segment 212 has cleared the forward rollers 314 and/or the diverter. The diverter 108 can pivot and allow the packaging segment 210 to travel past the diverter. Thus, the conveyance assembly 104 and/or the forward rollers 314 can be run and the segments of the packaging 102 conveyed without stopping the conveyance to allow for the diverter 108 to pivot.

Figure 10:
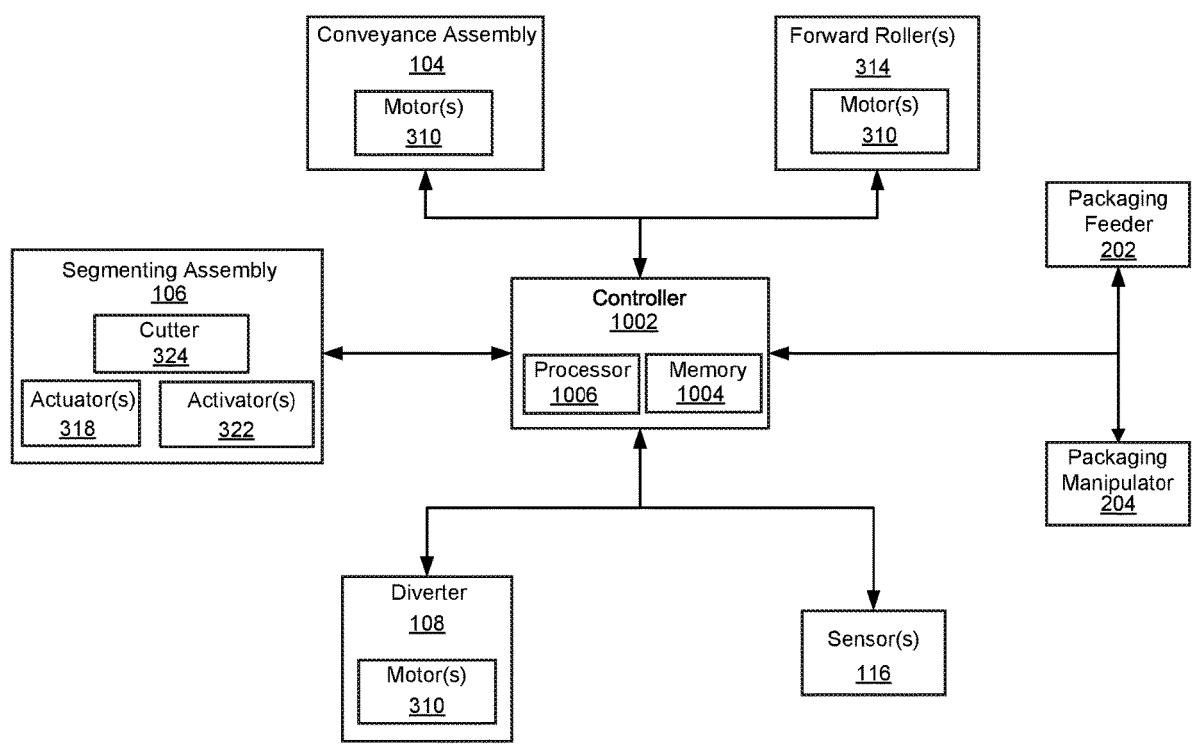
FIG. 10 is a simplified schematic diagram illustrating control aspects of the packaging sizer of FIG. 1.

Turning to FIG. 10, a simplified schematic diagram illustrating control aspects of the packaging sizer 100 of FIG. 1 is shown. A controller 1002 can communicate information and/or instructions associated with the packaging sizer 100. The controller 1002 can be in communication with the conveyance assembly 104, the segmenting assembly 106, the diverter 108, the packaging feeder 202, the packaging manipulation device 204, the forward rollers 314, and/or respective components associated with such elements, such as graphically included within each element in FIG. 10. The controller 1002 can communicate via a wired or wireless connection (e.g., Bluetooth). The controller 1002 can include memory 1004 and a processor 1006. The memory 1004 and the processor 1006 can be included in a single structure. However, the memory 1004 and processor 1006 may be part of a system of multiple interconnected devices.

The memory 1004 can include any type of memory device that retains stored information when powered off. The memory 1004 can be or include electrically erasable and programmable read-only memory ("EEPROM"), flash memory, or any other type of non-volatile memory. In some examples, at least part of the memory 1004 can include a medium from which the processor 1006 can read instructions. A non-transitory computer-readable medium can include electronic, optical, magnetic, or other storage devices capable of providing the processor 1006 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

The processor 1006 can execute instructions stored in the memory 1004 to perform operations, for example, determining an item status based on item data. The processor 1006 can include one processing device or multiple processing devices. Non-limiting examples of the processor 1006 include a Field-Programmable Gate Array ("FPGA"), an application-specific integrated circuit ("ASIC"), a microprocessor, etc.

The controller 1002 can communicate with and send instructions to the conveyance assembly 104, the segmenting assembly 106, the diverter 108, the packaging feeder 202, the packaging manipulation device 204, and/or respective components. The controller 1002 can send operating instructions to one or more of the components described herein to convey packaging 102 to a segmenting orientation, segment the packaging with a segmenting assembly 106, and/or position the diverter 108 for a position to direct one or more segments of the packaging. In some embodiments, the controller 1002 can additionally or alternatively send and/or receive instructions from the packaging feeder 202 and/or the packaging manipulation device 204.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   a feeder configured to convey a bag in a storage orientation;
   a bag sizer comprising:
      a conveyance pathway at least partially defined by a conveyance surface and configured to receive the bag from the feeder and convey the bag in the storage orientation;
      a segmenting assembly positionable to segment the bag in the storage orientation into a plurality of segments; and
      a diverter positionable between a first position for directing a first segment of the plurality of segments in a first direction and a second position for directing a second segment of the plurality of segments in a second direction;
   a bag manipulator configured to reorient the bag from the storage orientation to a loading orientation for loading of one or more items into the bag; and
   a controller operable to:
      access one or more dimensions of one or more items to be packaged within the bag;
      instruct the conveyance surface to convey the bag in the storage orientation to a position for segmenting of the bag;
      instruct the segmenting assembly to segment the bag into the first and second segments based on the one or more dimensions accessed regarding the one or more items to be packaged within the bag;
      instruct the diverter to pivot to the first position and the conveyance surface to convey the first segment out of the conveyance pathway in the first direction; and
      instruct the diverter to pivot to the second position and the conveyance surface to convey the second segment in the second direction;
      wherein the controller is further operable such that instructing the segmenting assembly to segment the bag further comprises instructing positioning of the segmenting assembly to change along a conveyance direction of the conveyance pathway based on the one or more dimensions accessed regarding the one or more items to be packaged within the bag.

2. The system of claim 1, wherein the segmenting assembly comprises a cutting device configured to pierce one or more surfaces of the bag and sever the first segment from the second segment.

3. The system of claim 1, further comprising the bag.

4. The system of claim 1, wherein the controller is further operable such that instructing the conveyance surface to convey the bag to the position for segmenting the bag comprises instructing the conveyance surface to convey the bag until a sensor detects that at least a portion of the bag is adjacent to the diverter.

5. An apparatus, comprising:
a conveyance pathway at least partially defined by at least one conveyance surface, the at least one conveyance surface being configured to receive and convey a package in a storage orientation;
a segmenting device configured to segment the package into a plurality of segments, wherein the segmenting device comprises a cutting device and an actuator configured to position the cutting device among different positions along the package for varying resulting sizes of the plurality of segments of the package;
a diverter positionable between a first position and a second position, wherein in the first position the diverter is configured to direct a first segment of the plurality of segments in a first direction, and in the second position the diverter is configured to direct a second segment of the plurality of segments in a second direction; and
a sensor configured to detect package position data associated with a portion of the package and communicate with a controller, the controller configured to send instructions to stop a conveyance of the package based on at least the package position data being indicative that a portion of the package is at or adjacent to the diverter and suitably positioned to facilitate segmenting of the package by the segmenting device prior to the package engaging or passing the diverter.

6. The apparatus of claim 5, wherein the at least one conveyance surface is incorporated within a set of conveyance assemblies that comprises a first conveyance assembly and a second conveyance assembly positioned on opposing sides of the segmenting device, the second conveyance assembly configured to convey the first or second segment.

7. The apparatus of claim 6, wherein the first conveyance assembly comprises an upper conveyance surface and a lower conveyance surface positioned a distance apart from one another to receive the package in the storage orientation, wherein the upper conveyance surface and the lower conveyance surface are included in the at least one conveyance surface.

8. The apparatus of claim 5, wherein the cutting device comprises at least one of a blade, a wire, a chain, a knife, a saw, a scalpel, a microtome, or a punch.

9. The apparatus of claim 5, further comprising a cutting guide positioned to be on an opposing side of the package from the segmenting device when the package is received by the apparatus, the cutting guide being configured to contact the segmenting device when the segmenting device is segmenting the package.

10. The apparatus of claim 5, wherein the at least one conveyance surface is further configured to position the package in a segmenting position for segmenting of the package by the segmenting device.

11. The apparatus of claim 5, wherein the conveyance pathway is further defined by a forward roller positioned on an opposing side of the segmenting device from a first portion of the at least one conveyance surface, and wherein the forward roller and the first portion of the at least one conveyance surface are configured to contact the package at different portions when the segmenting device is segmenting the package into the plurality of segments.

* * * * *